(12) United States Patent
Mikhailov

(10) Patent No.: US 6,816,318 B2
(45) Date of Patent: Nov. 9, 2004

(54) BEAM SHAPING DEVICE FOR SHAPING THE CROSS-SECTION OF A LIGHT BEAM AND SYSTEM FOR LAUNCHING INTO AN OPTICAL FIBER A LIGHT BEAM HAVING AN ELONGATED CROSS-SECTION AND BEING EMITTED BY AN ELONGATED LASER BEAM SOURCE

(75) Inventor: Alexei Mikhailov, Dortmund (DE)

(73) Assignee: Hentze-Lissotschenko Patentverwaltungs GmbH & Co. KG, Norderfriedrichskoog (DE)

( * ) Notice: Subject to any disclaimer, the term of this patent is extended or adjusted under 35 U.S.C. 154(b) by 0 days.

(21) Appl. No.: 10/470,271

(22) PCT Filed: Feb. 8, 2002

(86) PCT No.: PCT/EP02/01336

§ 371 (c)(1),
(2), (4) Date: Aug. 7, 2003

(87) PCT Pub. No.: WO02/065190

PCT Pub. Date: Aug. 22, 2002

(65) Prior Publication Data

US 2004/0114861 A1 Jun. 17, 2004

(30) Foreign Application Priority Data

Feb. 10, 2001 (DE) .......................................... 101 06 155

(51) Int. Cl.[7] ......................... G02B 27/12; G02B 27/14; G02B 5/04; G02B 7/18
(52) U.S. Cl. ....................... 359/640; 359/636; 359/831; 359/834
(58) Field of Search ................................ 359/631, 638, 359/640, 629, 633, 636, 618, 349, 637, 639, 625, 341.1, 341.3, 341.32, 831, 129, 833–837, 861; 372/75, 70; 385/31, 33, 35, 39; 312/99–101

(56) References Cited

U.S. PATENT DOCUMENTS

| 5,636,069 | A | | 6/1997 | Nightingale et al. ........ 359/831 |
| 5,825,551 | A | | 10/1998 | Clarkson et al. ............ 359/629 |
| 5,877,898 | A | | 3/1999 | Hollemann et al. ......... 359/619 |
| 6,028,722 | A | * | 2/2000 | Lang .......................... 359/834 |
| 6,665,068 | B1 | * | 12/2003 | Schoeppe et al. ........... 356/310 |

FOREIGN PATENT DOCUMENTS

| DE | 195 14 624 | 10/1996 |
| DE | 197 35 094 | 2/1998 |
| WO | WO 00/57229 | 9/2000 |

* cited by examiner

Primary Examiner—Hung Xuan Dang
Assistant Examiner—Joseph Martinez
(74) Attorney, Agent, or Firm—Hoffman, Wasson & Gitler, PC

(57) ABSTRACT

The invention relates to a beam shaping device for shaping the cross-section of a light beam, comprising at least one beam shaping unit with beam splitting means, beam deflecting means, and beam combination means. The beam splitting means are capable of diving up a light beam that is incident on the beam shaping unit into two partial beams. The beam deflecting means are capable of deflecting at least one of the partial beams onto the beam combination means and said beam combination means are capable of combining the two partial beams in such a manner that the cross-section of the light beam exiting the beam shaping unit is reduced in size in a first direction compared to the cross-section of the light beam that is incident on the beam shaping unit and is increased in size in a second direction perpendicular thereto. the invention is further characterized in that the beam combination means can also be used as beam splitting means, whereby only one of the partial beams is deflected by the beam deflecting means, while the other partial beam is directly incident on the beam combination means.

15 Claims, 4 Drawing Sheets

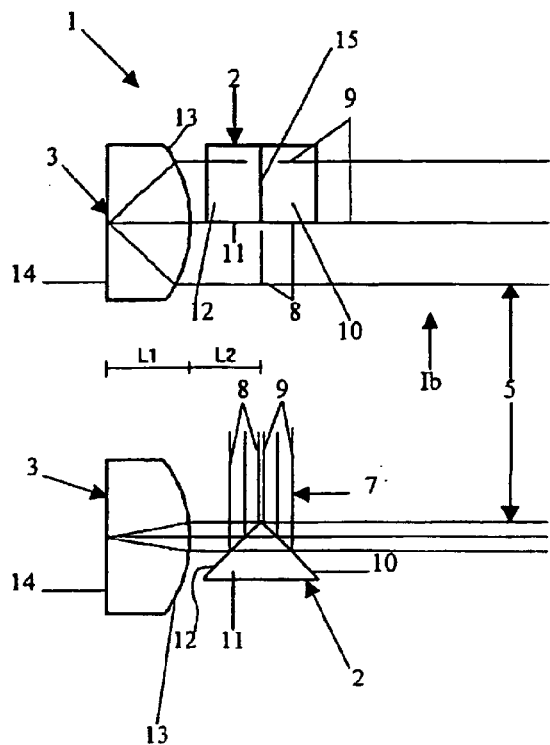
Fig. 1a
Fig. 1b
Fig. 1c
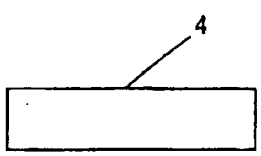
Fig. 1d
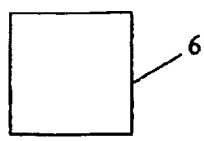

BEAM SHAPING DEVICE FOR SHAPING THE CROSS-SECTION OF A LIGHT BEAM AND SYSTEM FOR LAUNCHING INTO AN OPTICAL FIBER A LIGHT BEAM HAVING AN ELONGATED CROSS-SECTION AND BEING EMITTED BY AN ELONGATED LASER BEAM SOURCE

BACKGROUND OF THE INVENTION

This invention relates to a beam shaping device for shaping the cross section of a light beam comprising at least one beam shaping unit with beam division means, beam deflection means and beam combination means, the beam division means being able to divide a light beam incident on the beam shaping unit into two component beams, the beam deflection means being able to deflect at least one of the component beams to the beam combination means, and the beam combination means being able to combine the two component beams, such that the cross section of the light beam emerging from the beam shaping unit compared to the cross section of the light beam entering the beam shaping unit is reduced in the first direction and is enlarged in a second direction which is perpendicular to it. Furthermore, this invention relates to an arrangement for injecting a light beam with an elongated cross section proceeding from an elongated laser light source into an optical fiber, comprising a laser light source, a collimation unit which is located behind it in the beam direction, a beam shaping device of the aforementioned type and a focussing unit which is located behind the beam shaping device and which can focus the beam incident on it onto the optical fiber.

A beam shaping device of the aforementioned type and an arrangement of the aforementioned type are known from German patent DE 195 37 265 C1. In the embodiment of a beam shaping unit described in it a rhomboid prism pair which separates the incident radiation into two component beam bundles is used as the beam division means. The beam deflection means are two half cubic prisms which are integrated into the corresponding component beam paths, as a result of the relatively long path of the component beam bundle which has been traversed in this beam shaping unit there being a lens located between the rhomboid prism pair and the half cube prism. The beam combination means is a fifth prism which deflects the component beam bundles which are incident on it and combines them again.

The disadvantage in this beam shaping unit is that overall seven components are used, each of the individual component beams passing through eight optionally partially absorbing surfaces of optical components and being reflected each on two other surfaces of the aforementioned components, which surfaces may not be 100% reflective. Based on the many surfaces which must be transmitted or on which reflection must take place, a relatively great cost must be borne to coat the surfaces accordingly with respect to transmission or reflection. In particular, when several of these beam shaping units are set up in succession, such a beam shaping device will be less effective. Furthermore, as a result of the many components used and as a result of the high coating cost these beam shaping units will be extremely expensive.

An arrangement of the initially mentioned type is generally used whenever for example laser radiation proceeding for example from a laser diode bar is to be focussed on an optical fiber. In particular, as a result of the almost line-shaped laser light source with individual emission centers which are located spaced apart over the length of the line and the different divergences in the slow axis and fast axis direction, it is a good idea to use a beam shaping device of the initially mentioned type in order to repeatedly shape and combine the laser light emerging from the laser diode bar with an almost line-shaped cross section, so that a laser beam bundle with an almost square cross section is formed which then can be focussed more easily on the optical fiber. The effectiveness and economic efficiency of such an arrangement of course follow from the effectiveness and economic efficiency of the beam shaping device used in it.

One object of this invention is to devise a beam shaping device of the initially mentioned type and an arrangement of the initially mentioned type which are built efficiently and economically.

SUMMARY OF THE INVENTION

The beam combination means are also used as beam division means, only one of the component beams being deflected by the beam deflection means, conversely the other component beam being directly incident on the beam combination means. This measure drastically reduces the number of transmissions or reflections of the individual component beams. Furthermore, a beam shaping unit as claimed in the invention in the ideal case can consist of two individual optical components, conversely in the prior art for the same function seven components being necessary. In particular, one of the component beams will be incident directly on the beam combination means without prior passage through other optical components so that for this component beam the number of transmissions or reflections is minimized. Advantageously the second of the component beams for dividing the beam will run unhindered past the component which is being used as the beam combination means and the beam division means and will be deflected by the beam deflection means onto the functional sections of the component which is used as the beam combination means and the beam division means, which sections are used as beam combination means. This measure also minimizes the number of transmissions and reflections of the second component beam.

Advantageously the beam combination means comprise two specular surfaces which include an angle to one another, and each of the component beams which are to be combined by the beam combination means can be reflected on one of the specular surfaces. Especially for the case in which the specular surfaces are the outside surfaces of the beam combination means, each of the component beams will undergo only one reflection on this component, but not an additional transmission.

According to one preferred embodiment of this invention, there is a single prism as the beam combination means and at the same time the beam division means, the specular surfaces which reflect the component beams being made as preferably mirrored surfaces of this prism. Such a prism represents an especially simple but nevertheless very effective embodiment of the component which is used at the same time as the beam combination means and beam division means.

Advantageously the prism which is used as the beam division means and as the beam combination means can have a base surface which is made as an isosceles right triangle, the specular surfaces being those prism surfaces which each extend between the legs of the base surfaces so that the specular surfaces include an angle of 90° with one another. By choosing one such right-angled prism the desired beam combination function can be implemented most easily, in which specifically the two specular surfaces which are at an angle of 90° to one another are each aligned at an angle of 45° or −45° to the component beams which run from the opposite directions onto the prism.

Here the prism which is used as the beam division means or as the beam combination means can be located in the beam shaping unit such that the light beam which is incident on the beam shaping unit and which is to be shaped is cut in half in the first direction which is essentially perpendicular to the direction of propagation of the light beam, such that one of the two component beams which is formed by this halving runs past the prism onto the beam deflection means and the other of the two component beams which is formed by this halving is directly incident on the first of the two specular surfaces and is reflected by them in the direction of the light beam leaving the beam shaping unit. By this cutting of the beams in half on the prism the first of the two component beams in the entire beam shaping unit will ultimately undergo only one reflection on the first of the two specular surfaces and not transmission. The other of the component beams according to the choice of the beam deflection means will undergo two to four reflections or transmissions on the beam deflection means and exactly one reflection on the second specular surface, but an additional transmission neither on the beam division means nor on the beam combination means. In this way the number of transmissions and reflections is minimized with a simultaneous extremely economical structure of the beam shaping device as claimed in the invention.

Preferably the prism which is used as the beam division means or as the beam combination means is located in the beam shaping unit such that a light beam which is incident on the beam shaping unit runs parallel to the prism surface which connects to one another the two prism surfaces which are made as specular surfaces. This ensures that with the corresponding calibration of the light beam which is to be shaped exactly one half of the beam is incident on the first mirror surface and the other half of the beam runs past the prism in the direction to the beam deflection means and now parts of the beam are not absorbed or reflected away in an uncontrolled manner on any additional edges or the like.

Here it can be provided that the component beam which runs past the prism which is being used as the beam division means or beam combination means is incident on the beam deflection means in the propagation direction behind the prism; the beam deflection means deflect the component beam such that it is incident on the second of the specular surfaces in the direction which is opposite the propagation direction and is reflected by these surfaces in the direction of the light beam which is leaving the beam shaping unit. In this way the structure of the beam shaping device or beam shaping unit as claimed in the invention is relatively compact.

According to one preferred embodiment of this invention, the beam deflection means are made as an imaging unit and cause 1:1 imaging of the component beam which is incident on it onto the second specular surface. This imaging results in that the two component beams can be optimally combined by the beam combination means because especially no divergence or hardly any different divergence can occur between the two component beams.

Preferably the imaging unit here can have essentially the shape of a planoconvex lens, and the component beam can enter the imaging unit through the convex lens surfaces, can be reflected on the plane surface which is preferably mirrored and can emerge from the convex lens surface in the direction to the second specular surface of the beam combination means. In this way deflection and the associated 1:1 imaging is accomplished by two transmissions and one reflection so that overall very effective shaping of the beam cross section occurs.

According to another embodiment of this invention, the beam deflection means is made as a prism, and the component beam which is incident on the prism can be deflected by it in the direction which is opposite the propagation direction onto the second specular surface of the beam combination means. The choice of a prism as the beam deflection means is an especially good idea for very extended beam cross sections because by inserting a prism into the beam path no additional imaging errors can occur, as would be the case in a lens or the like.

Here the prism which is used as a deflection means can likewise have a base surface which is made as an isosceles right triangle, the component beam entering the prism passing vertically through the prism surface which connects the base sides of these triangles to one another and on each of the other two prism surfaces being reflected at an angle of essentially 45°, preferably the two prism surfaces on which the component beam is reflected being mirrored. A beam deflection means which is made in this way is characterized by an extremely simple and economical structure with high functionality.

Advantageously, the beam shaping device can have more than one beam shaping unit, especially three or four beam shaping units which are arranged in succession such that the cross section of the light beam is made smaller in each of the beam shaping units in the first direction and is enlarged in the second direction which is perpendicular to it. Here the cross section of the light beam emerging from the beam shaping unit or from one of the beam shaping units compared to the cross section of the light beam entering the beam shaping unit or one of the beam shaping units can be cut in half in the first direction and can be doubled in the second direction which is perpendicular to it. For example, by connecting four such beam shaping units in succession the light beam would be compressed by a factor of 16 in the first direction and in the second direction perpendicular to it pulled apart by a factor of 16. Thus such a beam shaping unit is especially suited for the initially mentioned arrangement for injecting of the laser beam emerging for example from a laser diode bar into an optical fiber.

BRIEF DESCRIPTION OF THE DRAWINGS

Other features and advantages of this invention become clear based on the following description of preferred embodiments with reference to the attached drawings.

FIG. 1a shows a schematic view of a beam shaping device as claimed in the invention;

FIG. 1b shows a view of the beam shaping device as shown by arrow Ib in FIG. 1a, FIG. 1c schematically shows the cross section of the beam which is to be shaped with the beam shaping device;

FIG. 1d schematically shows the cross section of the beam which has been shaped by the beam shaping device;

FIG. 2b shows a view according to the arrow IIb in FIG. 2a;

DETAILED DESCRIPTION OF THE INVENTION

Figure 2A:
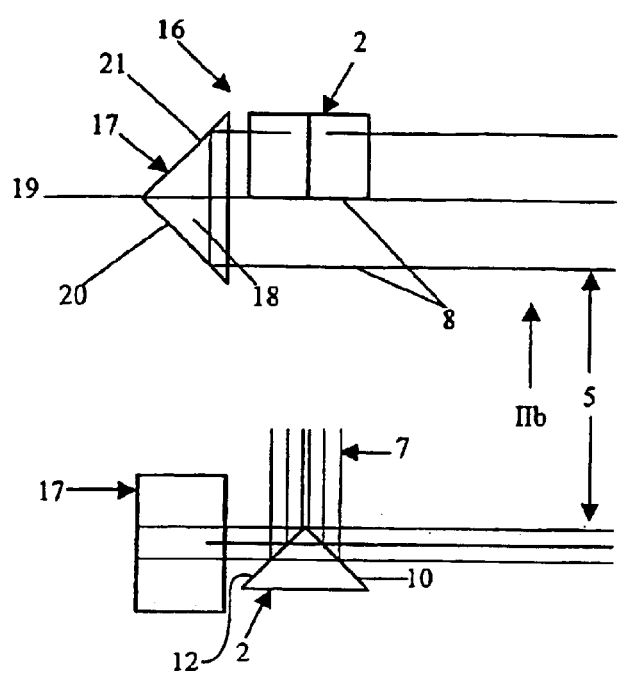
FIG. 2a shows a schematic view of another embodiment of a beam shaping device as claimed in the invention.

FIG. 1a and FIG. 1b show a beam shaping device as claimed in the invention which comprises a beam shaping unit 1 which consists of a beam division and beam combination means 2 made as a prism and a beam deflection means 3 which is made as an imaging unit. The cross section 4 of the light beam 5 which is to be shaped by the beam shaping unit 1 is shown in FIG. 1c. The cross section 6 of the light beam 7 which is shaped by the beam shaping unit 1 is shown in FIG. 1d.

FIG. 1a and FIG. 1b show that the light beam 5 which is incident on the beam shaping unit 1 has a relatively wide and flat cross section 4. The prism is made such that the light beam 5 which is to be shaped is divided by the prism into two component beams 8 and 9 of the same width. In FIG. 1a the component beam 8 runs past under the prism, conversely the component beam 9 is incident on the side of the prism facing the incident beam 5 which is to be shaped. The prism has two base surfaces 11 which are made as isosceles right triangles and three right-angle prism surfaces. Two of these prism surfaces are mirrored and thus form the specular surfaces 10, 12, by which the component beams 8, 9 can be reflected. The reflecting surfaces 10, 12 are each the connecting surfaces between the legs of the base surfaces 11 and thus enclose a right angle with one another along the apex line 15.

The base sides of the base surfaces 11 of the prism extend in the reference system which is given in FIG. 1a and FIG. 1b in the Z-direction so that the specular surface 10 facing the component beam 9 is aligned at an angle of 45° to the Y direction so that the component beam 9 which runs in the Z direction is deflected by reflection on the reflecting surface 10 in the Y direction.

The component beam 8 which runs past the lower base surface 11 of the prism in FIG. 1a enters the imaging unit which is located in FIG. 1a in the Z direction behind the prism 2. The imaging unit is made in the illustrated embodiment as a spherical or slightly aspherical planoconvex lens, with a front convex lens surface 13 facing the prism and a rear planar mirrored surface 14 which faces away from the prism. As is apparent from FIG. 1a, the component beam 8 enters the imaging unit through the lens surface 13 and is reflected on the mirrored surface 14 such that it emerges in the X direction offset in turn from the lens surface 13 and is incident on the second specular surface 12 of the prism. There the component beam 8 as a result of the orientation of the reflecting surface 12 is deflected up into the Y-direction at an angle of 45° to the vertical or to the Y direction, as is clearly apparent from FIG. 1b.

The imaging unit causes 1:1 imaging of the component beam 8. In particular, for this purpose an arrangement is feasible, as shown in FIG. 1a, in which the apex line 15 of the prism is aligned parallel to the reflecting surface 14 of the imaging unit and the distance of the apex line 15 to the frontmost edge of the lens surface 13 of the imaging unit is equal to the focal length $L_2$ of the lens surface 13. At the same time the thickness of the imaging unit, i.e. the distance between the frontmost point of the lens surface 13 and the mirrored surface 14 corresponds to the quantity $L_1$ which corresponds to the product of $L_2$ and the index of refraction of the medium from which the imaging unit is made.

Figure 2A:
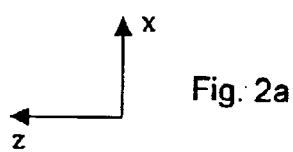
Figure 2B:
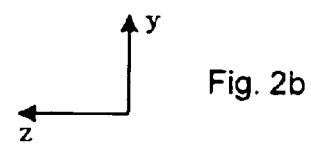

FIG. 2 shows another embodiment of a beam shaping device as claimed in the invention. In this embodiment a beam shaping unit 16 is used which consists of a beam division and beam combination means 2 which is made as a first prism and of a beam deflection means 17 which is made as a second prism. In FIG. 2a and FIG. 2b the same parts are provided with the same reference numbers as in FIG. 1. Instead of the imaging unit in FIG. 1, for the beam shaping unit 16 there is a second prism. This prism is likewise a vertical prism, i.e. a prism with an apex angle of 90°. The prism is oriented such that the base surfaces 18 lie in the XZ plane and the apex line 19 is located on the side of the second prism facing away from the first prism and is exactly flush with the border of the first prism in the Z-direction, which border is the lower one in FIG. 2a.

Figure 4:
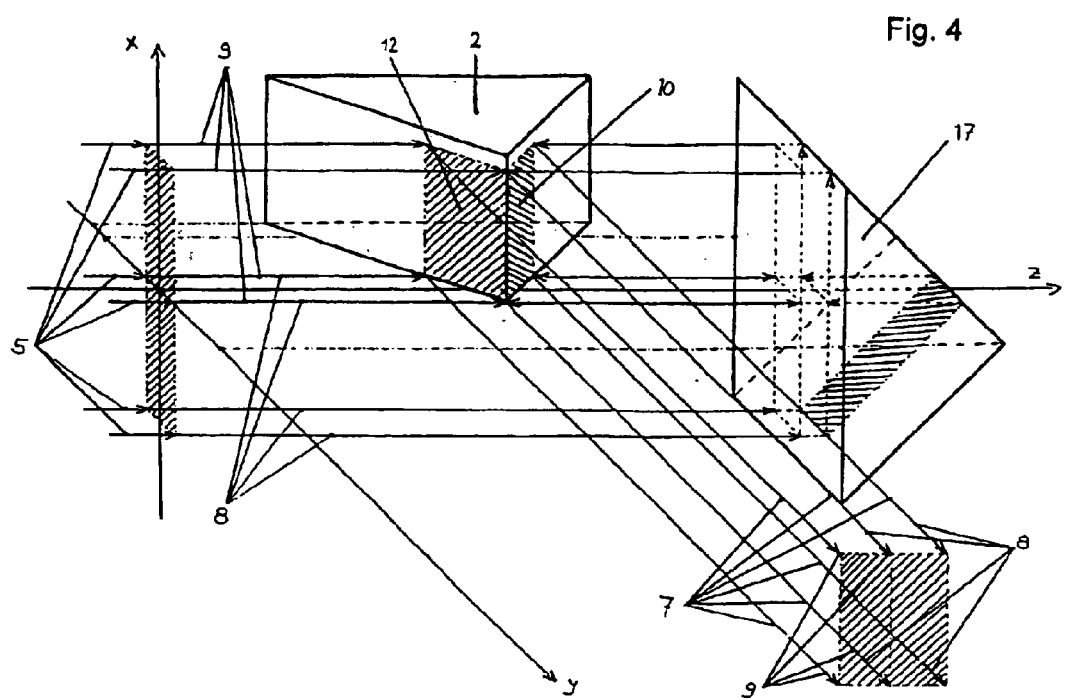
FIG. 4 shows a perspective view of the embodiment as shown in FIG. 2.

As is apparent from FIG. 2, the component beam 8 enters the second prism through the prism surface which connects the base surfaces 18 to one another and is reflected there on the two mirrored prism surfaces 20, 21 such that it emerges in the direction to the prism from the base surface 18 and is reflected equivalently to the component beam 9 on the specular surface 12 of the first prism in the Y direction. The embodiment as shown in FIG. 2 is shown in perspective for illustration in FIG. 4.

Figure 3:
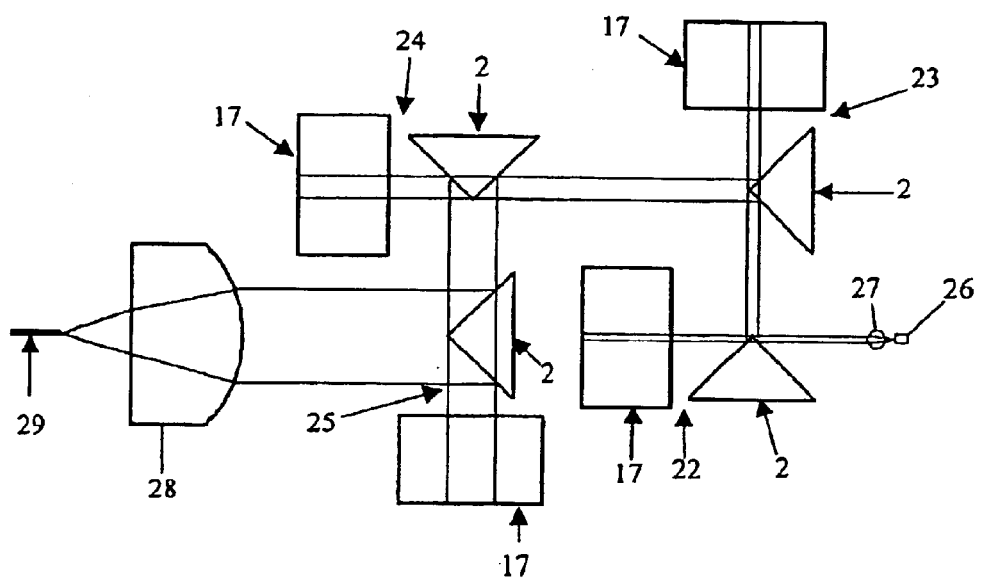
FIG. 3 shows a schematic of another embodiment of a beam shaping device as claimed in the invention with a laser light source and a glass fiber and the corresponding focussing lenses.

FIG. 3 shows a beam shaping device which comprises four beam shaping units 22, 23, 24, 25. The beam shaping units 22, 23, 24, 25 are each identical units which correspond to the beam shaping unit 16 from FIG. 2. Each of these beam shaping units 22, 23, 24, 25 thus comprises a first prism and a second prism which form a beam division and beam combination means 2 and a beam deflection means 17.

The light emerging from the laser light source 26 which is shown schematically as a point and which is made as a laser diode bar is incident on a first beam shaping unit 22 after passing through a collimation unit 27 which is made as a cylinder lens. In this beam shaping unit the cross section of the light beam is changed according to FIGS. 1c and 1d. Subsequently, the light beam in succession is incident on the other beam shaping units 23, 24, 25, where the cross section of the light beam is changed accordingly. As a result of the fact that the light beam is shortened in width in each of the beam shaping units 22, 23, 24, 25 by a factor of 2 and is doubled in height, the light beams after passing through the fourth beam shaping unit 25 will have a width which has been reduced by a factor of 16 and a height of its cross section which has been increased by a factor of 16. This is shown schematically in FIG. 3. After emerging from the last beam shaping unit 25 the light beam is incident on a focussing unit 28 which is made as an essentially spherical lens and by means of which it can be injected into the optical fiber 29.

What is claimed is:

1. A beam shaping device for shaping the cross section of a light beam comprising at least one beam shaping unit with beam division means, beam deflection means and beam combination means, the beam division means being able to divide a light beam which is incident on the beam shaping unit into two component beams, the beam deflection means being able to deflect at least one of the component beams to the beam combination means, and the beam combination means being able to combine the two component beams, such that the cross section of the light beam emerging from the beam shaping unit compared to a cross section of the light beam entering the beam shaping unit is reduced in the first direction (X) and is enlarged in a second direction (Y, Z) which is perpendicular to it, wherein the beam combination means are also used as beam division means, only one of the component beams being deflected by the beam deflection means, conversely the other component beam being directly incident on the beam combination means.

2. A beam shaping device as claimed in claim 1, wherein the beam combination means comprise two specular surfaces which include an angle to one another, and each of the component beams which are to be combined by the beam combination means can be reflected on one of the specular surfaces.

3. A beam shaping device as claimed in claim 2, wherein there is a single prism as the beam combination means and at the same time the beam division means, the specular surfaces which reflect the component beams being made as preferably mirrored surfaces of this prism.

4. A beam shaping device as claimed in claim 3, wherein the prism which is used as the beam division means and as the beam combination means has a base surface which is made as an isosceles right triangle, the specular surfaces being those prism surfaces which each extend between the legs of the base surfaces so that the specular surfaces include an angle of 90° C. with one another.

5. A beam shaping device as claimed in claim 3, wherein the prism which is used as the beam division means or as the beam combination means is located in the beam shaping unit such that the light beam which is incident on the beam shaping unit and which is to be shaped is cut in half in the first direction (X) which is essentially perpendicular to the direction of propagation (Z) of the light beam such that one of the two component beams which is formed by this halving runs past the prism onto the beam deflection means and the other of the two component beams which is formed by this halving is directly incident on the first of the two specular surfaces and is reflected by them in the direction (Y) of the light beam (7) leaving the beam shaping unit.

6. A beam shaping device as claimed in claim 3, wherein the prism which is used as the beam division means or as the beam combination means is located in the beam shaping unit such that a light beam which is incident on the beam shaping unit runs parallel to the prism surface which connects the two prism surfaces which are made as specular surfaces to one another.

7. A beam shaping device as claimed in claim 3, wherein the prism which is being used as the beam division means or beam combination means is located in the beam shaping unit such that the two specular surfaces include an angle of 45° or −45° with the propagation direction (Z) of the light beam which is to be shaped by the beam shaping unit.

8. A beam shaping device as claimed in claim 5, wherein the component beam which runs past the prism which is being used as the beam division means or beam combination means is incident on the beam deflection means in the propagation direction (Z) behind the prism, the beam deflection means deflect the component beam such that it is incident on the second of the specular surfaces in the direction opposite the propagation direction (Z) and is reflected by these surfaces in the direction (Y) of the light beam which is leaving the beam shaping unit.

9. A beam shaping device as claimed in claim 1, wherein the beam deflection means are made as an imaging unit and cause 1:1 imaging of the component beam which is incident on it onto the second specular surface.

10. A beam shaping device as claimed in claim 9, wherein the imaging unit has essentially the shape of a planoconvex lens, and the component beam can enter the imaging unit through the convex lens surface, can be reflected on the plane surface which is preferably mirrored and can emerge from the convex lens surface in the direction to the second specular surface of the beam combination means.

11. A beam shaping device as claimed in claim 1, wherein the beam deflection means is made as a prism, and the component beam which is incident on the prism can be deflected by it in the direction opposite the propagation direction (Z) onto the second specular surface of the beam combination means.

12. A beam shaping device as claimed in claim 11, wherein the prism which is used as a deflection means likewise has a base surface which is made as an isosceles right triangle, the component beam entering the prism passing vertically through the prism surface which connects the base sides of these triangles to one another and on each of the other two prism surfaces is reflected at an angle of essentially 45° preferably the two prism surfaces on which the component beam is reflected being mirrored.

13. A beam shaping device as claimed in claim 1, wherein the beam shaping device comprises more than one beam shaping unit, especially three or four beam shaping units which are arranged in succession such that the cross section of the light beam is made smaller in each of the beam shaping units in the first direction and is enlarged in the second direction which is perpendicular to it.

14. A beam shaping device as claimed in claim 1, wherein the cross section of the light beam emerging from the beam shaping unit or from one of the beam shaping units compared to the cross section of the light beam entering the beam shaping unit or one of the beam shaping units is cut in half in the first direction (X) and is doubled in the second direction (XZ) which is perpendicular to it.

15. An arrangement for injecting a light beam with an elongated cross section proceeding from an elongated laser light source into an optical fiber, comprising a laser light source, a collimation unit which is located behind it in the beam direction (Z), a beam shaping device with the features of claim 1 and a focussing unit which is located behind the beam shaping device and which can focus the light beam incident on it onto the optical fiber.

* * * * *